United States Patent
Jeng

(10) Patent No.: US 10,741,066 B2
(45) Date of Patent: Aug. 11, 2020

(54) SYSTEM AND METHOD FOR SINGLE-LOOP VEHICLE SPEED ESTIMATION USING INDUCTIVE LOOP SIGNATURE DATA

(71) Applicant: CLR Analytics Inc., Irvine, CA (US)

(72) Inventor: Shin-Ting Jeng, Corona, CA (US)

(73) Assignee: CLR Analytics Inc., Irvine, CA (US)

( * ) Notice: Subject to any disclaimer, the term of this patent is extended or adjusted under 35 U.S.C. 154(b) by 0 days.

(21) Appl. No.: 15/857,603

(22) Filed: Dec. 28, 2017

(65) Prior Publication Data

US 2019/0206242 A1      Jul. 4, 2019

(51) Int. Cl.
| | | |
|---|---|---|
| *G08G 1/052* | (2006.01) | |
| *G06F 17/18* | (2006.01) | |
| *G08G 1/042* | (2006.01) | |
| *G08G 1/015* | (2006.01) | |

(52) U.S. Cl.
CPC ............. *G08G 1/052* (2013.01); *G06F 17/18* (2013.01); *G08G 1/015* (2013.01); *G08G 1/042* (2013.01)

(58) Field of Classification Search
CPC ........ G08B 21/22; G08B 13/08; H04W 4/027
See application file for complete search history.

(56) References Cited

U.S. PATENT DOCUMENTS

2003/0038624 A1*  2/2003  Hilliard .................. G08G 1/042
                                                        324/200
2004/0056778 A1   3/2004  Hilliard

OTHER PUBLICATIONS

Park et al, "An innovative single loop speed estimation model with advanced loop data" IET Intelligent Transport Systems, vol. 4, Issue 4, pp. 232-243, Dec. 2010.*
Carlos Sun, Stephen G. Ritchie; "Individual Vehicle Speed Estimation Using Single Loop Inductive Waveforms." Journal of Transportation Engineering American Society of Civil Engineers, vol. 125, Issue 6, pp. 531-538. Nov. 1999.
Andre Tok, Sarah Hernandez, Stephen G. Ritchie; "Accurate Individual Vehicle Speeds from Single Inductive Loop Signatures." Transportation Research Board 88th Annual Meeting, Washington DC, Jan. 11-15, 2009.
Seri Oh, Stephen G. Ritchie, Cheol Oh; "Real-time traffic measurement from single loop inductive signatures." Transportation Research Record: Journal of the Transportation Research Board 1804: pp. 98-106. 2002.
Cheol Oh, Stephen G. Ritchie; "Anonymous Vehicle Tracking for Real-time Traffic Surveillance and Performance on Signalized Arterials." TRB 2003 Annual Meeting. Jan. 2003.

(Continued)

*Primary Examiner* — Hongmin Fan
(74) *Attorney, Agent, or Firm* — Hsuanyeh Law Group, PC

(57) ABSTRACT

A system and method are disclosed for using vehicle signature data from a single inductive loop sensor to estimate vehicle speed. Two regressors are calculated from the vehicle signature: the "inverse of the duration" and the "slew rate". A point is found by normalizing the vehicle signature in amplitude and determining the earliest point in the normalized signature to cross a set threshold. The slew rate is the slope of the normalized vehicle signature at this point. Regression models are generated from empirical data for several vehicle categories. Using the regression model for the category of vehicle and the two regressors vehicle speed is estimated. The regression models have been demonstrated to be robust eliminating the need for site-specific calibration or estimation.

12 Claims, 9 Drawing Sheets

(56) References Cited

OTHER PUBLICATIONS

Benjamin Coifman, Seoungbum Kim; "Speed Estimation and Length Based Vehicle Classification from Freeway Single-loop Detectors." Transportation Research Part C: Emerging Technologies, vol. 17, Issue 4, pp. 349-364. Aug. 2009.

Yinhai Wang, Nancy L. Nihan; "Can Single-Loop Detectors Do the Work of Dual-Loop Detectors?" Journal of Transportation Engineering American Society of Civil Engineers, vol. 129, Issue 2, pp. 169-176. Mar. 2003.

Yinhai Wang, Nancy L. Nihan; "Freeway Traffic Speed Estimation Using Single Loop Outputs." Transportation Research Record: Journal of the Transportation Research Board 1727: pp. 120-126. 2000.

Wei-Hua Lin, Joy Dahlgren, Hong Huo; "Enhancement of Vehicle Speed Estimation with Single Loop Detectors." Transportation Research Record: Journal of the Transportation Research Board 1870: pp. 147-152. 2004.

Benjamin Coifman, Srikanth Neelisetty; "Improved Speed Estimation From Single-Loop Detectors With High Truck Flow." Journal of Intelligent Transportation Systems: Technology, Planning, and Operations, vol. 18, Issue 2, pp. 138-148. 2014.

Seri Park, Stephen G. Ritchie, Cheol Oh; "Innovative Single-loop Speed Estimation Model with Advanced Loop Data." IET Intelligent Transport Systems, vol. 4, Issue 4, pp. 232-243. Dec. 2010.

\* cited by examiner

| | |
|---|---|
| *stn* | site1 |
| *VID* | 524442 |
| *l* | Loop1 |
| *t* | 06:54:37.809 |
| *s* | 629 |
| *m* | 12,12,13,14,15,16,18,19,21,23,24,26,28,30,32,35,37,40,42,45,48,51,54,57,61,64,67,71,75,79,83,88,92,97,102,108,113,119,125,131,138,145,152,159,167,175,183,192,200,209,218,228,237,247,257,266,275,284,294,302,311,319,326,333,340,347,353,358,363,367,370,374,377,380,382,384,386,388,390,391,391,392,393,393,393,392,391,390,388,386,383,381,378,375,372,369,366,363,360,357,355,352,349,347,344,342,339,337,334,332,329,326,323,320,317,314,311,308,305,302,299,296,293,290,287,284,281,278,276,273,271,269,267,266,265,264,264,264,265,266,268,270,273,275,278,282,286,291,295,300,305,310,316,322,328,334,339,345,351,357,362,367,372,376,379,383,385,387,388,389,390,389,388,387,385,382,379,375,371,367,362,358,353,348,344,340,336,332,329,327,325,323,321,321,320,321,322,324,326,329,332,335,339,343,346,350,354,358,361,364,367,370,372,374,376,378,379,379,380,380,380,379,379,377,376,374,373,371,368,366,364,362,360,359,357,356,355,354,353,353,353,353,353,354,355,357,358,361,363,365,368,371,374,377,381,384,387,390,393,396,399,402,404,407,409,410,411,412,413,413,413,413,412,411,410,409,407,405,403,401,399,397,395,393,391,389,388,387,387,387,388,389,390,391,393,396,398,401,403,407,410,414,422,426,431,435,439,443,447,450,453,456,458,460,462,463,464,464,464,463,462,461,460,458,456,454,451,448,446,444,441,438,436,434,432,430,428,426,425,424,423,422,421,421,421,422,423,423,424,426,427,429,431,432,433,435,436,437,437,436,435,434,432,429,425,421,417,412,407,402,396,390,384,378,372,366,359,353,346,339,333,327,321,315,310,305,300,296,292,288,285,283,281,279,277,276,276,275,276,276,278,279,284,286,290,294,298,303,308,314,319,325,331,336,342,346,351,354,357,359,360,360,360,358,356,354,350,346,342,337,333,327,322,316,311,305,300,294,289,283,279,274,269,265,260,256,251,248,243,240,236,233,230,227,225,222,220,218,217,216,214,213,213,213,213,214,214,216,217,219,221,223,225,227,229,232,234,236,238,240,242,244,245,247,248,249,250,251,252,253,254,255,257,258,260,263,265,268,271,274,277,281,289,293,298,302,307,312,317,323,328,334,339,345,351,356,363,368,374,380,385,390,395,399,403,407,411,413,416,417,419,419,419,417,416,413,409,405,400,394,388,381,374,366,357,349,339,329,319,309,299,288,278,267,257,247,23 |

FIG. 3A

SYSTEM AND METHOD FOR SINGLE-LOOP VEHICLE SPEED ESTIMATION USING INDUCTIVE LOOP SIGNATURE DATA

GOVERNMENT SUPPORT

This invention was made with government support under contract number DTRT57-14-C-10025 awarded by the Department of Transportation. The government has certain rights in the invention.

BACKGROUND

Inductive loop sensors are currently the most invested and widely deployed traffic detection infrastructure for traffic data collection from highways and traffic signal control in the United States. Inductive Loop Detection (ILD) technology is very reliable and provides accurate traffic count data. Properly installed loop sensors have a service life that is typically comparable to the road surface itself.

When installed in a double loop speed trap configuration, an inductive loop can provide point speed and effective vehicle length information. The double loop sensors are widely applied in Continuous Vehicle Classification (CVC) and Weigh-In-Motion (WIM) sites. However, most of the traffic detection stations are Continuous Count Stations (CCS), which are commonly installed in a single loop configuration that can provide traffic count and occupancy data only.

Therefore, when installed in a single loop configuration, aggregate traffic speed is usually estimated using other methods (Coifman and Kim, 2009; Wang and Nihan, 2003; Wang and Nihan, 2000; Lin et al., 2004) which assume some representative static or dynamic effective vehicle length value commonly known as the g-factor. However, such approach does not perform well to yield reliable estimates under congestion or under heavy truck traffic (Coifman and Neelisetty, 2014).

Unlike the conventional ILD systems that provide bivalent outputs to indicate vehicle presence, the Inductive Loop Signature-based detector systems measure and output the inductance changes of the inductive loops. The series of inductance changes caused by a traversing vehicle produce a waveform output and is referred as inductive loop signature or inductive vehicle signature (or simply "vehicle signature"). With the availability of inductive loop signature technology, researchers have demonstrated the advantages of using individual vehicle signature to generate vehicle speeds using single loop sensors (Tok et al., 2009; Park et al., 2010; Oh et al., 2002; Sun and Ritchie, 1999). These approaches can be summarized in two steps in general: (1) assigning vehicles to predetermined groups with homogeneous attributes via clustering analysis and/or neural network training; and (2) applying estimation models assigned to each group to generate speed estimates.

Vehicle classification has been implemented by the Federal Highway Administration (FHWA) to assist in evaluating highway use and developing policies, standards, and procedures. FHWA defines 13 vehicle classes which are defined by factors such as the number of wheels, axles, and trailers.

SUMMARY

A system and method are provided for using vehicle signature data from a single inductive loop sensor to estimate vehicle speed. In some embodiments two regressors are calculated from the vehicle signature: the "inverse of the duration" and the "slew rate". A point is found by normalizing the vehicle signature in amplitude and determining the earliest point in the normalized signature to cross a set threshold. The slew rate is the slope of the normalized vehicle signature at this point. Regression models are generated from empirical data for several vehicle categories. Using the regression model for the category of vehicle and the two regressors vehicle speed is estimated. The regression models have been demonstrated in a real-world implementation to be robust eliminating the need for site-specific calibration or estimation.

In some aspects the invention relates to a system for estimating a speed of a vehicle, the system comprising: a hardware interface configured to receive a vehicle signature from an inductive loop sensor; a processor; a non-volatile, computer-readable storage medium having a plurality of modules containing code executable by the processor, the plurality of modules including: a vehicle profile module that determines a first variable that is proportional to a temporal duration of the vehicle signature and a second variable that is proportional to a slope of the vehicle signature; and a speed estimation module that estimates the speed of the vehicle using the first and second variable and a regression model for a vehicle category to which the vehicle belongs.

In some embodiments the vehicle profile module determines the first variable by computing an inverse of the temporal duration of the vehicle signature. In another embodiment the vehicle profile module determines the second variable by normalizing the vehicle signature, identify an earliest time point at which the amplitude of the normalized vehicle signature exceeds a threshold value, and calculates the slope of the normalized vehicle signature at said earliest time point. In some embodiments the threshold value is between 0.3 and 0.5, and in some the threshold value is about 0.4.

In some embodiments the hardware interface is further configured to receive vehicle classification information and the system further comprises a vehicle cluster module configured to assign the vehicle to the vehicle category based on the vehicle classification information.

In some embodiments the vehicle signature comprises data representing a series of inductance changes caused by the vehicle traversing the inductive loop sensor, thereby producing a waveform.

Another aspect relates to a method for estimating a speed of a vehicle, the method comprising: (i) receiving a vehicle signature signal from an inductive loop sensor through a hardware interface upon traversal of the vehicle over the inductive loop sensor; (ii) operating a hardware processor to: measure a temporal duration of the vehicle signature signal; determine a first regressor from the temporal duration; measure a slope at a particular point of the vehicle signature signal; determine a second regressor from the slope; select a regression model based on a category in which the vehicle is classified; and estimate vehicle speed with the regression model using the first regressor and the second regressor; and (iii) recording the vehicle speed to a non-volatile, computer-readable storage medium.

In some embodiments operating the hardware processor to determine the first regressor comprises calculating an inverse of the temporal duration and storing the inverse of the temporal duration as the first regressor.

In some embodiments operating the processor to measure the slope comprises operating the processor to: normalize the vehicle signature signal in amplitude; identify a first time point, the first time point being an earliest time point at which the amplitude of the normalized vehicle signature signal exceeds a threshold value; and calculating the slope of the normalized vehicle signature signal at the first time point. In some embodiments the threshold value is between 0.3 and 0.5.

In some embodiments the method further comprises receiving through the hardware interface vehicle classification information; and operating the processor to determine the category in which the vehicle is classified from the vehicle classification information.

Yet another aspect relates to a system for estimating a speed of a vehicle, the system comprising: an inductive loop sensor having a single loop; an instrument that, in response to the vehicle passing over the inductive loop sensor, measures a vehicle signature of the vehicle from the inductive loop sensor; a vehicle classification unit that determines a class of the vehicle; a processor; and a non-volatile, computer-readable storage medium having a plurality of modules containing code executable by the processor, the plurality of modules including a vehicle profile module that determines a first variable that is proportional to a duration of the vehicle signature and a second variable that is proportional to a slope of the vehicle signature; and a speed estimation module that estimates the speed of the vehicle using the first and second variable and a regression model for the class of the vehicle.

In some embodiments the first variable is the inverse of the duration of the vehicle signature. In some embodiments the second variable is the slope of the vehicle signature after normalization at a first crossing of a threshold value.

In some embodiments the vehicle signature is normalized by dividing the vehicle signature less the vehicle signature's minimum value by the vehicle signature's range, and the threshold value is between 0.3 and 0.5.

In some embodiments the vehicle classification unit determines the class of the vehicle from the vehicle signature. In some embodiments the vehicle classification unit is a module among the plurality of modules and is configured to determine the class of the vehicle using a k-nearest neighbors algorithm (KNN) and an interpolated representation of the vehicle signature.

In some embodiments the vehicle classification unit is configured to use an interpolated representation of the vehicle signature having between 20 and 50 samples.

The foregoing is a non-limiting summary of the invention, which is defined by the attached claims.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings:

FIG. 3A is an example of an input data package according to some embodiments;

DETAILED DESCRIPTION

Figure 1:
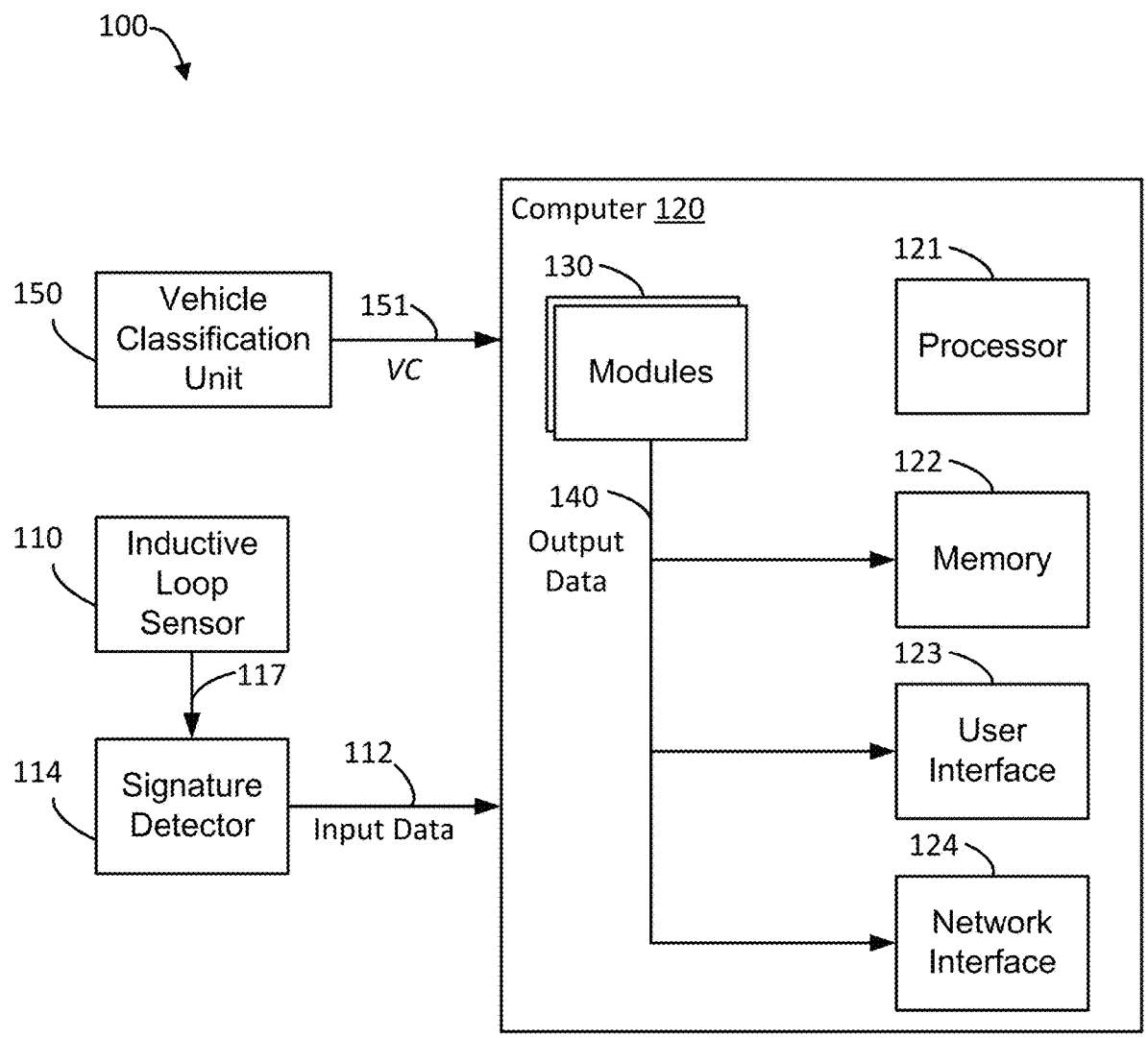
FIG. 1 is a block diagram of a system for vehicle speed estimation from an inductive loop sensor according to some embodiments.

Prior art systems using single-loop inductive loop sensor (ILS) data to estimate vehicle speed are usually calibrated to the particular traffic detection station. Re-calibration and re-estimation are required when transferring these systems to traffic detection stations where conditions differ. Re-calibration and re-estimation are necessary because the vehicle grouping modules used in prior art systems are trained using data collected from only one or two stations and each of the derived vehicle groups contain similar vehicles attributes that are arbitrarily selected by the developers. The regression models are then constructed and estimated for each vehicle group.

Since vehicle attributes are investigated, evaluated, and selected to meet modeling and training needs during the development of vehicle grouping modules, significant changes in vehicle types and vehicle composition may require a new vehicle attribute set to replace the original one. If a new vehicle attribute set is generated, the vehicle grouping modules will need to be re-trained and re-tested with new dataset (i.e., re-calibration). If new vehicle groups are created during this process, the original regression models will no longer be applicable and new regression models will need to be built for the new vehicle groups (i.e., re-estimation).

In addition, when applying such approaches to a new location with similar vehicle types but different proportions, re-estimating the regression models may be needed. As pointed out in Oh et al.'s study (2002), re-estimation of the regression parameters was required when applying Sun and Ritchie's approach (1999) to a new dataset collected from a different location with higher traffic volume in longer vehicles. Park et al. (2010) also acknowledged the same observation when they tested their single-loop vehicle speed estimation model at another location with higher truck (i.e., longer vehicle) volume.

The inventor has recognized and appreciated the need for a system to estimate vehicle speeds using single loop sensors without concerns of transferability. Such system should provide accurate vehicle speed estimates from single loop sensors without the need for model re-calibration and re-estimation. Rather than relying on trained vehicle attributes extracted from inductive vehicle signatures, vehicle groups are defined based on the mechanical characteristics of the vehicles. For example, in some embodiments vehicle groups are based on the FHWA 13 vehicle category classification. The FHWA 13 vehicle classes are defined by factors such as the number of wheels, axles, and trailers. Other standards may also be used to define suitable vehicle groups. Determining the vehicle groups based on mechanical aspects of the vehicle eliminates the dependency on selection of reliable and applicable vehicle attributes to generate vehicle groups. Thus vehicle attributes can be fixed and changes in traffic (e.g., vehicle types and vehicle composition) at a new location do not substantially affect speed estimation performance.

The methods and apparatus disclosed herein may be used to estimate vehicle speed from single-loop ILS data without site-specific calibration or estimation. Thus, the disclosed technology can be deployed without model re-calibration and re-estimation.

FIG. 1 provides a block diagram of system 100 for single-loop vehicle speed estimation using inductive loop signature data. According to some embodiments, system 100 includes an inductive loop sensor (ILS) 110, signature detector 114 coupled to ILS 110, a computer 120 coupled to signature detector 114, and a vehicle classification unit 150 coupled to computer 120.

ILS 110 is any suitable inductive loop sensor such as a single-loop ILS. In some embodiments, ILS 110 is an inductive loop detector that has a 6-×6-ft square loop (or thereabout), or a 6-ft diameter round loop (or thereabout). Though, any suitable ILS may be used. ILS 110 may be embedded or otherwise provided in/on a roadway which receives vehicular traffic. In multi-lane roadways, for example, inductive loop sensors may be provided for each lane, or one inductive loop sensor may be provided for several lanes. Some systems 100 can have ILS installed at multiple locations along a roadway.

Signature detector 114 includes instrumentation for measuring a response 117 of ILS 110. In some embodiments signature detector 114 includes an advanced signature detector card. Detector 114 may convert an analog response of ILS 110 to digital data. Detector 114 provides input data 112 to computer 120. In some embodiments, detector 114 includes limited computing power and can pre-process input data 112 to identify vehicle signatures and sends such signatures as input data 112. In some embodiments, additional information (described further below) is included with input data 112. In another embodiment, detector 114 provides a stream of measurements from ILS 110 as input data 112 to computer 120 which processes the data to identify vehicle signatures. It should be appreciated that vehicle signatures may be identified in any suitable hardware and/or software.

The response 117 of ILS 110 may be one or more time varying signals. The temporal shape of the signal may depend upon the type of ILS, the vehicle type, and the speed of the vehicle, and other potential factors.

Computer 120 is used to analyze input data 112 and provide output data 140, which includes vehicle speed estimates. Computer 120 includes a processor 121, memory 122, user interface 123, network interface 124, and modules 130. Computer 120 may be used to execute functional modules 130 as well as certain functions described in connection with the vehicle classification unit 150 and signature detector 114. The representation of certain components being within computer 120 and other being outside computer 120 is particular to the illustrated embodiment. It should be appreciated that other configurations are also contemplated. Further, the notion of a computer is used broadly, and it is not critical whether computer 120 is implemented in a single device (e.g., a network-enabled standalone personal computer), a network of devices (e.g., a computer cluster), or in another suitable configuration (e.g., one or more virtual machines executed on one or more server devices).

Processor 121 may be configured to control system 100 and may be operatively connected to memory 122. Processor 121 may be any suitable processing device, physical or virtual, such as for example and not limitation, a central processing unit (CPU), digital signal processor (DSP), controller, addressable controller, general or special purpose microprocessor, microcontroller, addressable microprocessor, programmable processor, programmable controller, dedicated processor, dedicated controller, or any suitable processing device. In some embodiments, processor 121 comprises one or more processors. For example, processor 121 may have multiple cores, be comprised of multiple microchips, or distributed over a communications network.

Memory 122 may be integrated into processor 121 and/or may include "off-chip" memory that may be accessible to processor 121, for example, via a memory bus (not shown). Memory 122 may store software modules that when executed by processor 121 perform desired functions. Memory 122 may be any suitable type of non-transient, computer-readable storage medium, for example and not limitation, RAM, a nanotechnology-based memory, one or more floppy disks, compact disks, optical disks, volatile and/or non-volatile memory devices, magnetic tapes, flash memories, hard disk drive, circuit configurations in Field Programmable Gate Arrays (FPGA), or other semiconductor devices, or other tangible, non-transient computer storage medium.

User interface 123 may include devices for interacting with a user. These devices may include, by way of example and not limitation, keypad, pointing device, camera, display, touch screen, audio input, and audio output.

Network interface 124 may be any suitable combination of hardware and software configured to communicate over a network. For example, network interface 124 may be implemented as a network interface driver and a network interface card (NIC). The network interface driver may be configured to receive instructions from other components of computer 120 to perform operations with the NIC. The NIC provides a wired and/or wireless connection to the network. The NIC is configured to generate and receive signals for communication over a network. In some embodiments, computer 120 is distributed among a plurality of networked computing devices. Each computing device may have a network interface for communicating with other computing devices forming computer 120.

Computer 120 may have one or more functional modules 130. Modules 130 may operate to perform specific functions such as processing and analyzing data. Modules 130 may be implemented in hardware, software, or any suitable combination thereof. Memory 122 of computer 120 may store computer-executable software modules that contain computer-executable instructions. For example, one or more of modules 130 may be stored as computer-executable code in memory 122. These modules may be read or retrieved from memory 122 for execution by processor 121. Such software may be created any suitable way. For example, the software code may be written using one or more programming languages. The software code may be compiled as executable machine language code or intermediate code that is executable on a virtual machine.

One or more such modules 130 may be used to generate output data 140 including the estimated vehicle speed. Output data 140 may be provided to memory 122 for storage (e.g., for subsequent analysis), to an output device of user interface 123, or communicated to a remote computer over a computer network using network interface 124. Though, output data 140 may be used in any suitable way.

Vehicle classification unit 150 generates vehicle classification information (VC) 151. Unit 150 may determine VC 151 using data from detector 114 and/or from other available sensors. For example, a sensor may identify the FHWA class of a vehicle and this information may be included as vehicle classification information 151 by unit 150. Vehicle classification unit 150 may be implemented through any suitable hardware and/or software.

Figure 2:
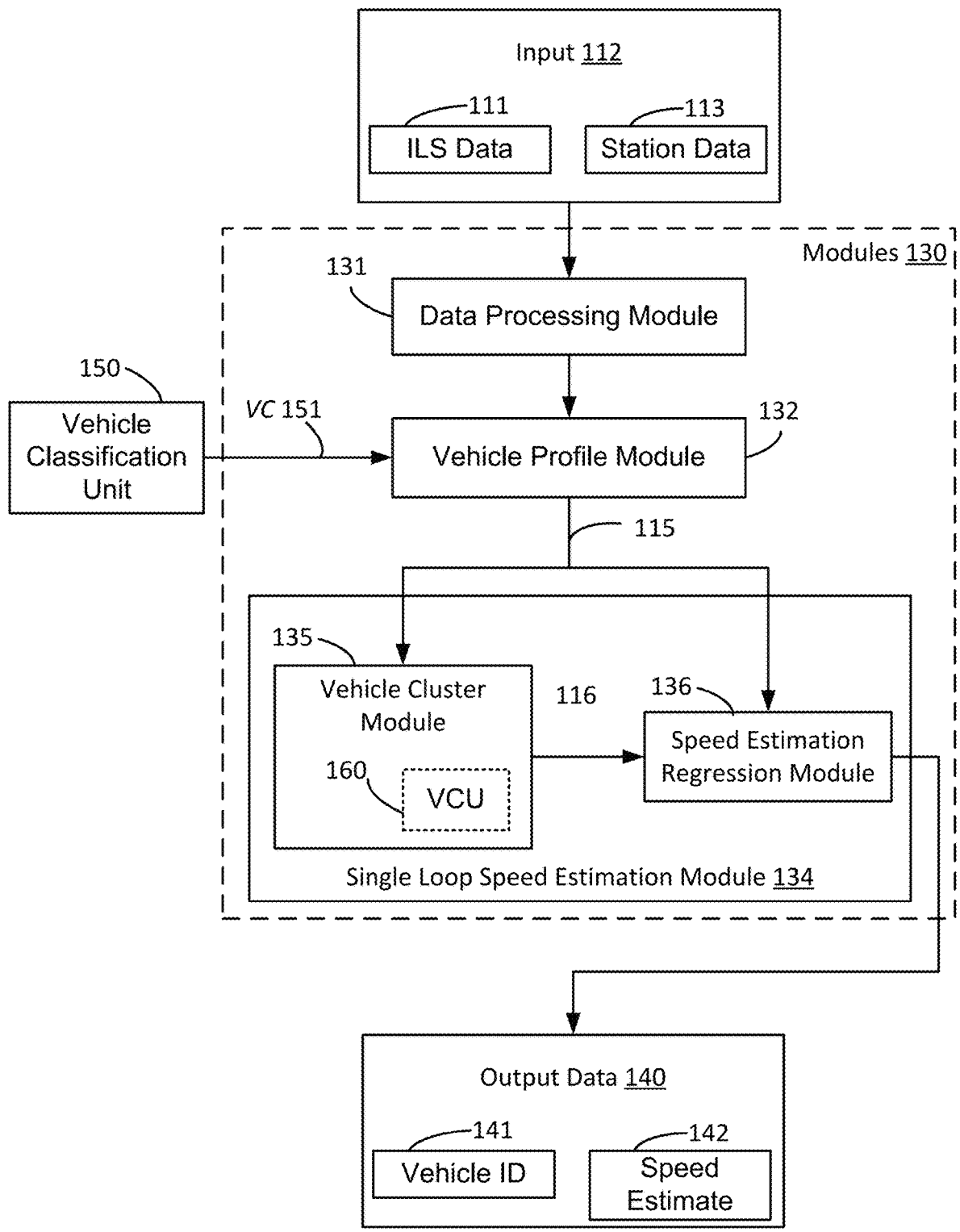
FIG. 2 is a block diagram illustrating the interoperation of functional modules used to estimate vehicle speed from an inductive loop sensor according to some embodiments.

Modules 130 may be used to process input data 112 provided by detector 114. FIG. 2 is a block diagram illustrating an embodiment of functional modules 130 that may be utilized to generate output data 140. Also shown in FIG. 2 is the flow of data between the functional modules along with the input data 112 and output data 140 which modules 130 act up and produce, respectively.

In the embodiment shown in FIG. 2, modules 130 include a data processing module 131, a vehicle profile module 132, a single loop speed estimation module 134, a vehicle cluster module 135, and a speed estimation regression module 136. In some embodiments vehicle classification information is provided by a vehicle classification unit 150, and in some other embodiments vehicle classification information is generated by vehicle classification unit (VCU) module 160 from the vehicle signature.

Modules 130 operate on input data 112 which includes ILS data 111 and station data 113.

As discussed above with reference to FIG. 1, signature detector 114 may parse responses 117 of ILS 110 into a vehicle signature for a single vehicle passing over ILS 110. The vehicle signature may be parsed by creating a window about a temporal region of the ILS sensor response that meets certain parsing criteria. For example, a vehicle signature may be defined as the temporal period during which response 117 exceeds a set threshold plus a certain temporal amount of adjacent response. Whether detector 114 or a software module of computer 120 parses the ILS response into vehicle signatures is not critical. In the embodiments discussed in connection with FIG. 2, input data 112 has been parsed into "packages" that contain a single vehicle signature. It should be appreciated that in some embodiments a parsing module parses input data 112 in such packages.

Additionally, input data 112 includes station data 113. Station data 113 includes the additional information needed to map ILS data 111 to a specific time and location (e.g., a traffic detection station and lane). While FIG. 1 shows input data 112 (and implicitly station data 113) being provided by signature detector 114, it should be appreciated that station data 113 may be provided from any suitable source.

In some embodiments, input data 112 is digital data including the following: (i) stn—the traffic detection station identifier, (ii) VID—a vehicle identifier associated with the parsed signature, (iii) l—the lane ID, (iv) t—a timestamp, (v) s—the number of data points in the signature, and (vi) m—a vector of the data points in the vehicle signature.

The vehicle identifier, VID, may be any suitable identifier for the vehicle. In some embodiments, VID is a unique, arbitrary identifier.

The sample rate, r, of the vehicle signature, m, may be fixed or specified by another variable. In some embodiments, the sample rate is 1,000 samples per second or thereabout. Though, any suitable sample rate may be used (e.g., in excess of around 500 samples per second). It should be appreciated that while the discussion of some embodiments use the sample rate for calculations, the sample interval, T, defined as the time interval between samples, may be used instead (by substituting $T=r^{-1}$).

Figure 3B:
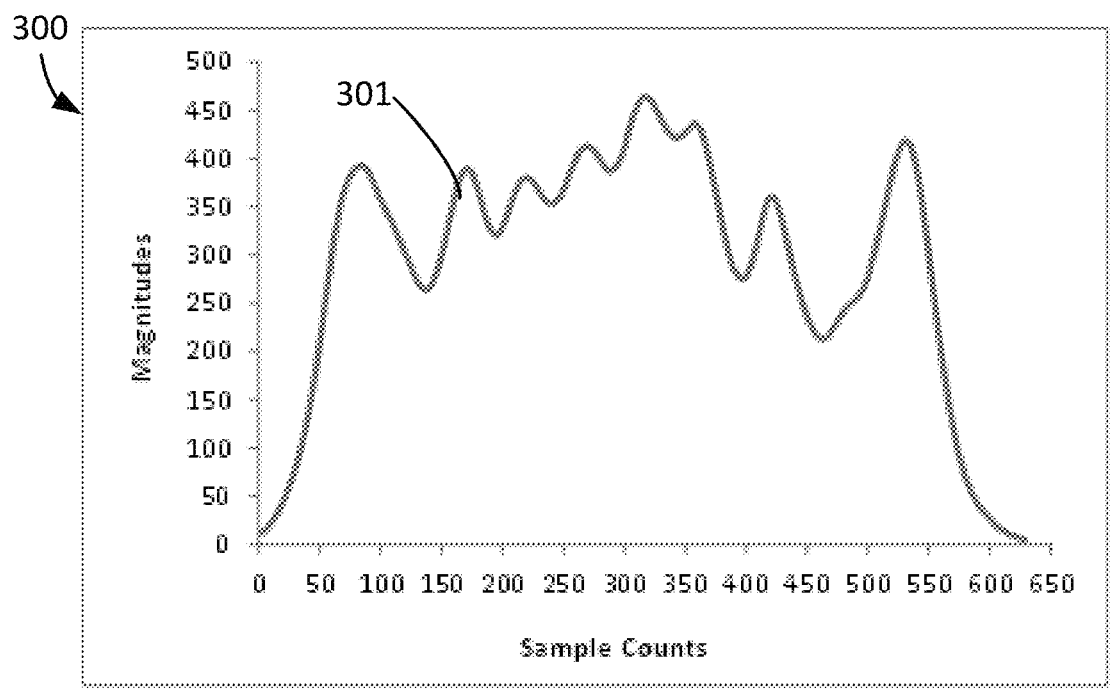
FIG. 3B is a plot of the vehicle signature of the example input data in FIG. 3A.

An example of a package of input data 112, represented in human readable form, is provided in FIG. 3A. The vehicle signature, m, in this package has 629 entries (s=629), each representing the magnitude of an inductance change of the ILS 110 due to the traversing vehicle. FIG. 3B shows a plot 300 of vehicle signature data points 301 for the example input data 112 of FIG. 3A. Again, this is merely a single package of parsed input data 112 and many packages of input data 112 will be processed as vehicles pass over ILS 110. Each package of input data 112 corresponds to a potential passing of a vehicle over ILS 110 and has the resulting vehicle signature. Thus, modules 130 shown in FIG. 2 may operate serially on a plurality of packages of input data 112. Further, ILS 110 may be one of a plurality of such sensors, potentially located in different vehicle lanes or at different locations along a roadway. Thus, modules 130 may additionally operate on the packages of input data 112 in parallel or in other ways.

Each package of input data 112 may be processed as follow. Data processing module 131 receives input data 112 and determines if the data is representative of a vehicle passing over ILS 110 or if it is not. The latter is considered "noise" and is filtered out by data processing module 131; no further processing is performed on such packages of input data 112. Module 131 may use any suitable filtering process to evaluate input data 112. For example, a package of input data 112 may be considered "noise" if the number of data points in the signature is smaller than a set threshold or if the greatest magnitude of vehicle signature is smaller than another set threshold.

If module 131 has sufficient confidence that the vehicle signature in a given package of input data 112 is for a vehicle, the data is then passed to vehicle profile module 132. Vehicle profile module 132 produces and outputs vehicle signature feature data 115 including (i) invD—inverse duration of the signature, (ii) SR—slew rate, and (iii) VC—vehicle classification information 151. Inverse duration and slew rate will be used as regressors to estimate vehicle speed. Vehicle speed is related to time and distance. The selected regressors of inverse duration and slew rate provide temporal information and spatial information, respectively, and thus can be effectively used to estimate vehicle speed.

The inverse duration is defined as 1/duration, where duration is the duration of the vehicle signature (e.g., s/r s·T).

The slew rate is the slope at a predetermined point within a normalized version of the signature. The normalized signature, $m_n$, is simply the vehicle signature scaled in amplitude between 0 and 1. The normalized signature, $m_n$, can be found by equation [1]:

$$m_n = \frac{m - m(i_{min})}{m(i_{max}) - m(i_{min})} \quad [1]$$

Where $i_{max}$ is the index of an entry of m where m has the greatest magnitude and $i_{min}$ is the index of an entry of m where m has the smallest magnitude. Of course, in case of multiple points in m sharing the greater (or smallest) magnitude, any of such points may be chosen as $i_{max}$ (or $i_{min}$).

The index, $i_p$, in $m_n$ is identified as the smallest index, for which $m_n(i)$ is greater than the predetermined value. In some embodiments, the predetermined value is between 0.3 and 0.5, for example, 0.4 or thereabouts. The slope at $m_n(i_p)$, which is the slew rate SR, is then calculated in any suitable way. For example, the slope may be calculated as $$SR = r \cdot [m_n(i_q) - m_n(i_p)] \quad [2]$$

where $i_q$ is the index for the next point ($i_q > i_p$) for which $m_n(i_q) - m_n(i_p)$ is a positive number and r is the sample rate.

The vehicle classification information 151, or VC, may be provided by vehicle classification unit 150. In some embodiments, vehicle classification unit 150 is not available to provide vehicle classification information 151. In such embodiments, vehicle profile module 132 outputs vehicle signature feature data 115 including (i) invD—inverse duration of the signature, (ii) SR—slew rate, and (iii) $m_c$—interpolated vehicle signature for vehicle classification. This interpolated vehicle signature, $m_c$, may be generated using a cubic spline interpolation algorithm. Though any suitable interpolation algorithm may be used. The number of points in interpolated vehicle signature $m_c$ may be, for example, 30, 40, 50, 60, 70. In some embodiments, 30 or more points are used, though any number that is suitable may be used.

In the example input data 112 shown in FIG. 3A, the sample rate, r, is 1,000 samples per second. The duration is thus 0.629 seconds (629 [samples]/1,000 [samples/second]), and the inverse duration, invD, is 1/0.629 or about 1.5898.

Figure 3C:
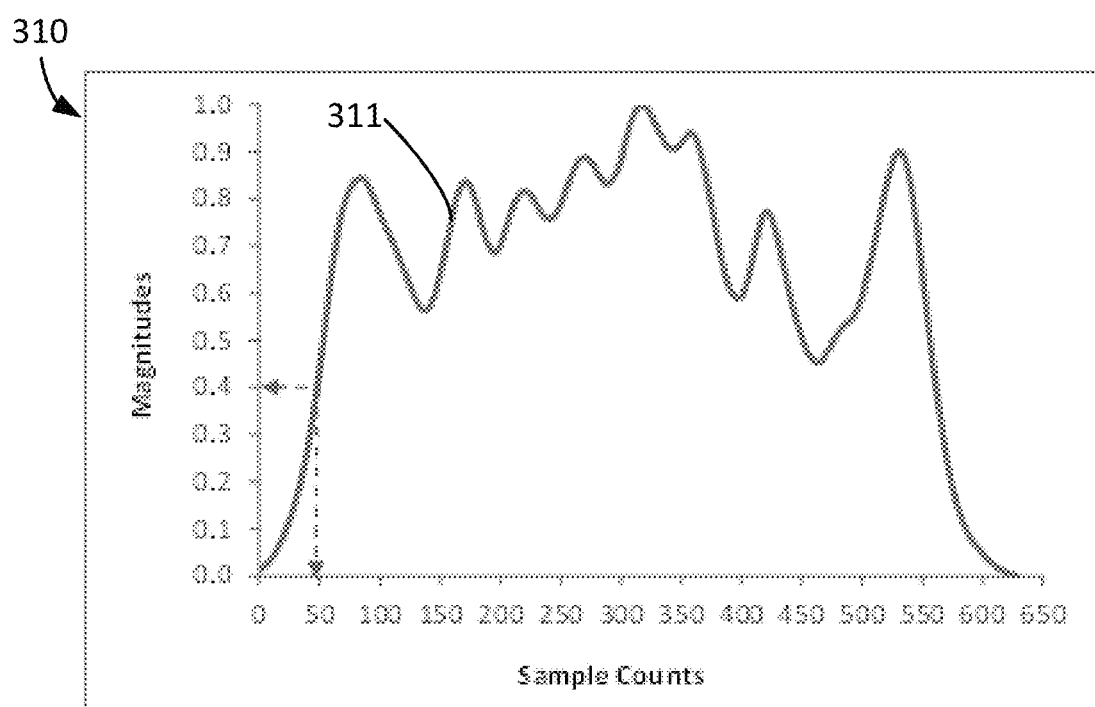
FIG. 3C is a plot of the normalized vehicle signature of the example input data in FIG. 3A.

Plot 310 in FIG. 3C shows the normalized vehicle signature 311, $m_n$, for the example vehicle signature, m, in input data 112 in FIG. 3A (and plotted in FIG. 3B). Normalized vehicle signature 311 was calculated using equation [1] where $m(i_{max})$ is found to be 464 (at indexes 316, 317, and 318) and $m(i_{min})$ is found to be 5 (at indexes 628 and 629). The index $i_p$ is found to be 48 where $m_n$ is about 0.4074 and index $i_q$ is found to be 49 where $m_n$ is about 0.4248. For the sample rate r=1,000, SR is calculated using equation [2] to be 17.43.

Figure 3D:
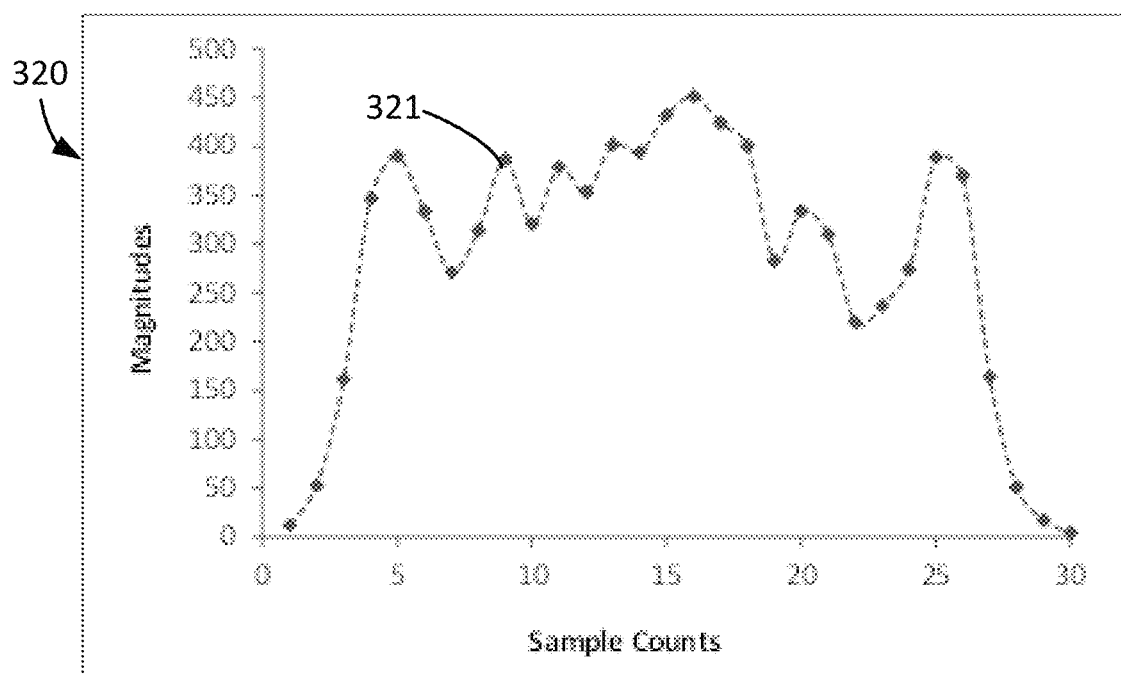
FIG. 3D is a plot of the vehicle signature of the example input data in FIG. 3A downsampled to 30 points and interpolated using a cubic spline interpolation algorithm.

FIG. 3D shows plot 320 of interpolated vehicle signature 321 having 30 points.

Returning to FIG. 2, vehicle signature feature data 115 are provided to single-loop speed estimation module 134. There are two procedures to generate the single-loop speed estimates. First, vehicle cluster module 135 assigns each vehicle to a predefined vehicle category. In some embodiments, 4 vehicle categories are defined based on the thirteen FHWA categories:

(VC1) motorcycles;
(VC2) [a] passenger cars, [b] other two-axle, four-tire, single-unit vehicles;
(VC3) [a] passenger cars and other two-axle, four-tire, single-unit vehicles pulling trailers, [b] buses, [c] two-axle, six-tire, single-unit trucks, [d] three-axle single-unit trucks; [e] four or more axle single-unit trucks; and
(VC4) [a] four or fewer axle single-trailer trucks, [b] five-axle single-trailer trucks, [c] six or more axle single-trailer trucks, [d] five or fewer axle multi-trailer trucks, [e] six-axle multi-trailer trucks; [f] seven or more axle multi-trailer trucks.

If data 115 includes vehicle classification information (VC) 151 (e.g., FHWA 13 vehicle class), the vehicle will be assigned to its corresponding vehicle category directly by vehicle cluster module 135. If VC is not available in data 115, vehicle cluster module 135 may include vehicle classification unit module 160 that estimates VC from the interpolated vehicle signature, $m_c$. Vehicle cluster module 135 then uses the estimated VC to classify the vehicle in a vehicle category. In some embodiments, a k-nearest neighbors (KNN) algorithm is used by VCU 160 to estimate VC from the interpolated vehicle signature. Though, any suitable algorithm may be used.

Vehicle cluster module 135 provides the vehicle category 116 to speed estimation regression module 136 to facilitate speed estimation of the corresponding vehicle. Speed estimation regression module 136 has a speed estimation regression model for each vehicle category; the models have two regressors (i.e., predictor variables): inverse duration (invD) and slew rate (SR). Vehicle cluster module 135 selects the speed estimation regression model for the vehicle category 116 and generates output data 140 which includes vehicle identification (VID) 141 and a corresponding vehicle speed estimate 142. Other information such as stn, l, t, s, and m may also be included with output data 140.

A speed estimation regression model was built for each vehicle category using empirical data collected on highways in California, USA. The empirical data collected include vehicle signature, vehicle speed, and vehicle class. From this information, the predictor variables are calculated and shown to strongly correlate with vehicle speed provided vehicles are properly categorizes.

Having identified the predictor variables a suitable regression model is used. In some embodiments, the speed estimation regression model is a multiple linear regression model according to the following equation:

$$Speed = a + b \cdot invD + c \cdot SR$$

Where Speed is the estimated individual vehicle speed and a, b, and c are regression parameters that can be calculated from the empirical data.

The empirical data used to build the regression model may be collected in any suitable way. For example, double inductive loop sensors, video cameras, radar, direct observation and any other suitable sensor may be used to collect the needed data. Ground truth speed may be estimated in accordance with the type of sensor used. In an example embodiment, ground-truth vehicle speeds are determined from double loop sensors. Specifically, the individual vehicle speed is calculated using the distance between the leading edges of the double loop sensors divided by the time headway between the two indices, $i_p$, obtained from the two loop sensors. The response of a single loop is used as the vehicle signature data. Vehicle class may be determined, for example, by direct observation.

FIGS. 4-7 show plots of empirical data for the four vehicle categories discussed in connection with the example embodiment above (i.e., vehicle categories VC1, VC2, VC3, and VC4).

Figure 4B:
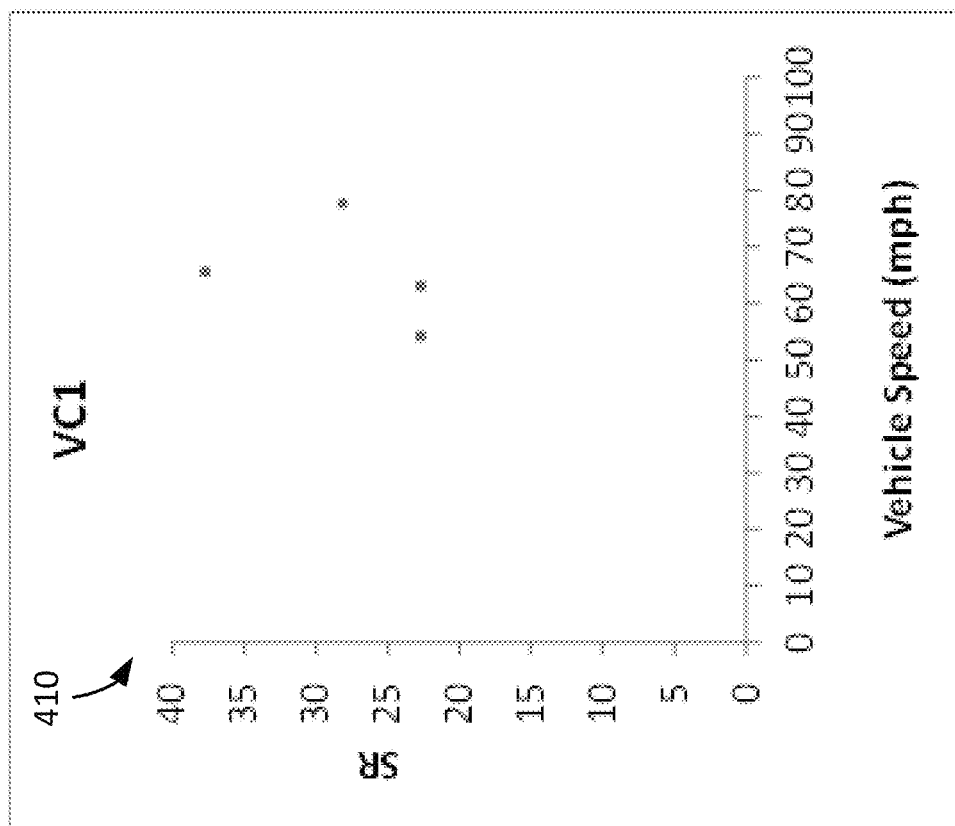
FIG. 4B has a plot showing a scatter plot of Speed versus SR for the same vehicle category 1 (VC1) empirical data.
Figure 4A:
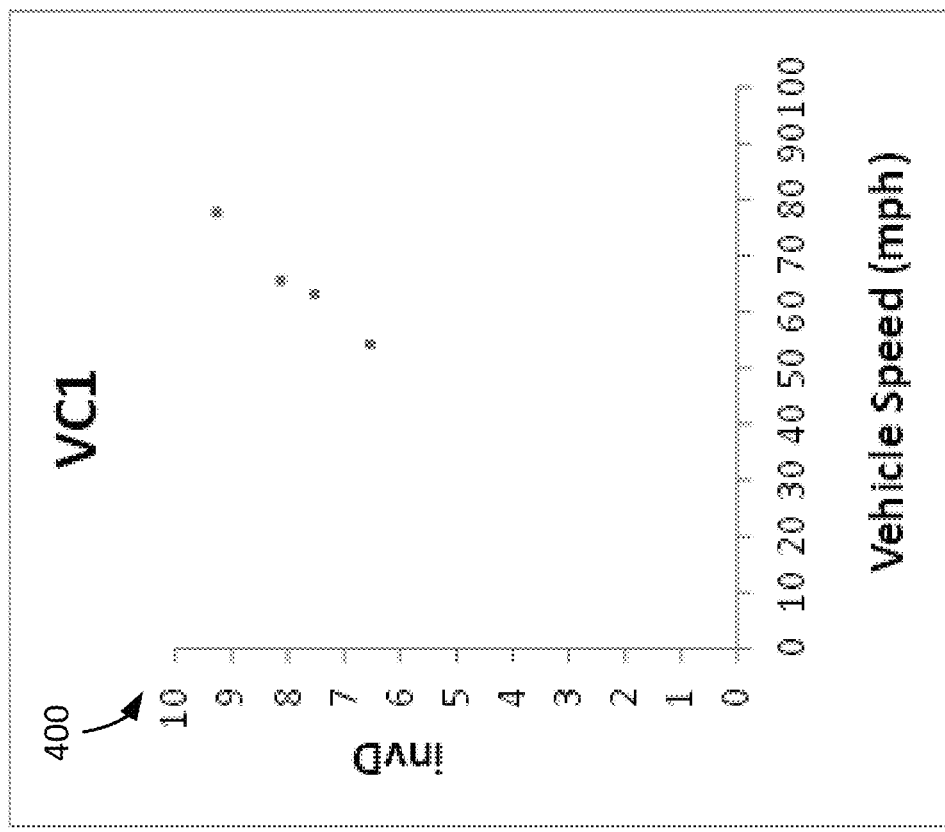
FIG. 4A has a plot showing a scatter plot of Speed versus invD for some empirical data for vehicle category 1 (VC1) vehicles.

FIG. 4A has a plot 400 showing a scatter plot of Speed versus invD for some empirical data. FIG. 4B has a plot 410 showing a scatter plot of Speed versus SR for the same empirical data. Each data point is for a specific vehicle. The symbol for each data point indicates the vehicle category assigned in accordance with the four vehicle categories.

FIG. 4A has a plot 400 showing a scatter plot of Speed versus invD for empirical data for VC1. FIG. 4B has a plot 410 showing a scatter plot of Speed versus SR for the same VC1 data.

Figure 5A:
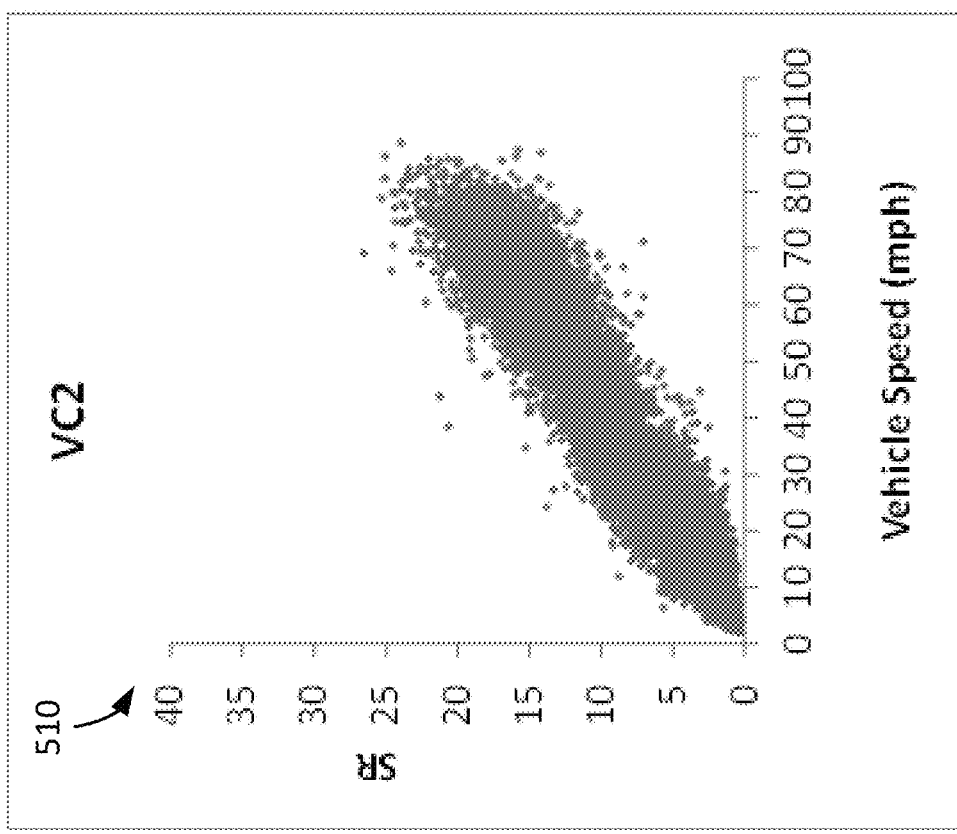
FIG. 5A has a plot showing a scatter plot of Speed versus invD for some empirical data for vehicle category 2 (VC2) vehicles.
Figure 5B:
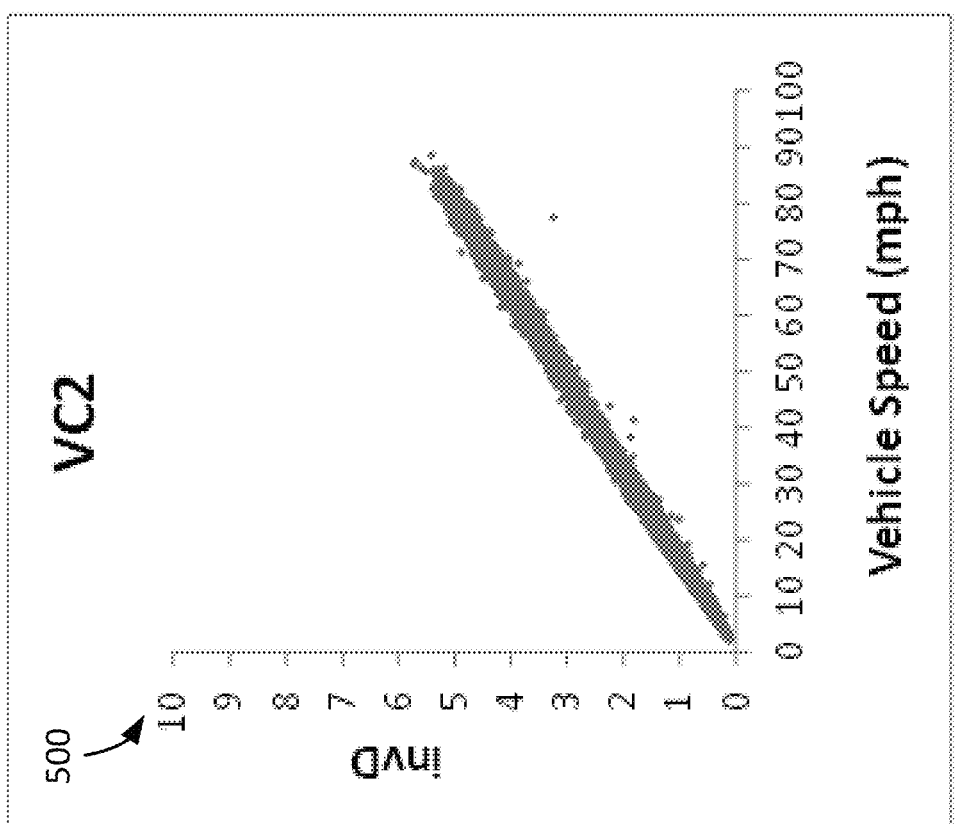
FIG. 5B has a plot showing a scatter plot of Speed versus SR for the same vehicle category 2 (VC2) empirical data.

FIG. 5A has a plot 500 showing a scatter plot of Speed versus invD for empirical data for VC2. FIG. 5B has a plot 510 showing a scatter plot of Speed versus SR for the same VC2 data.

Figures 6A, 6B:
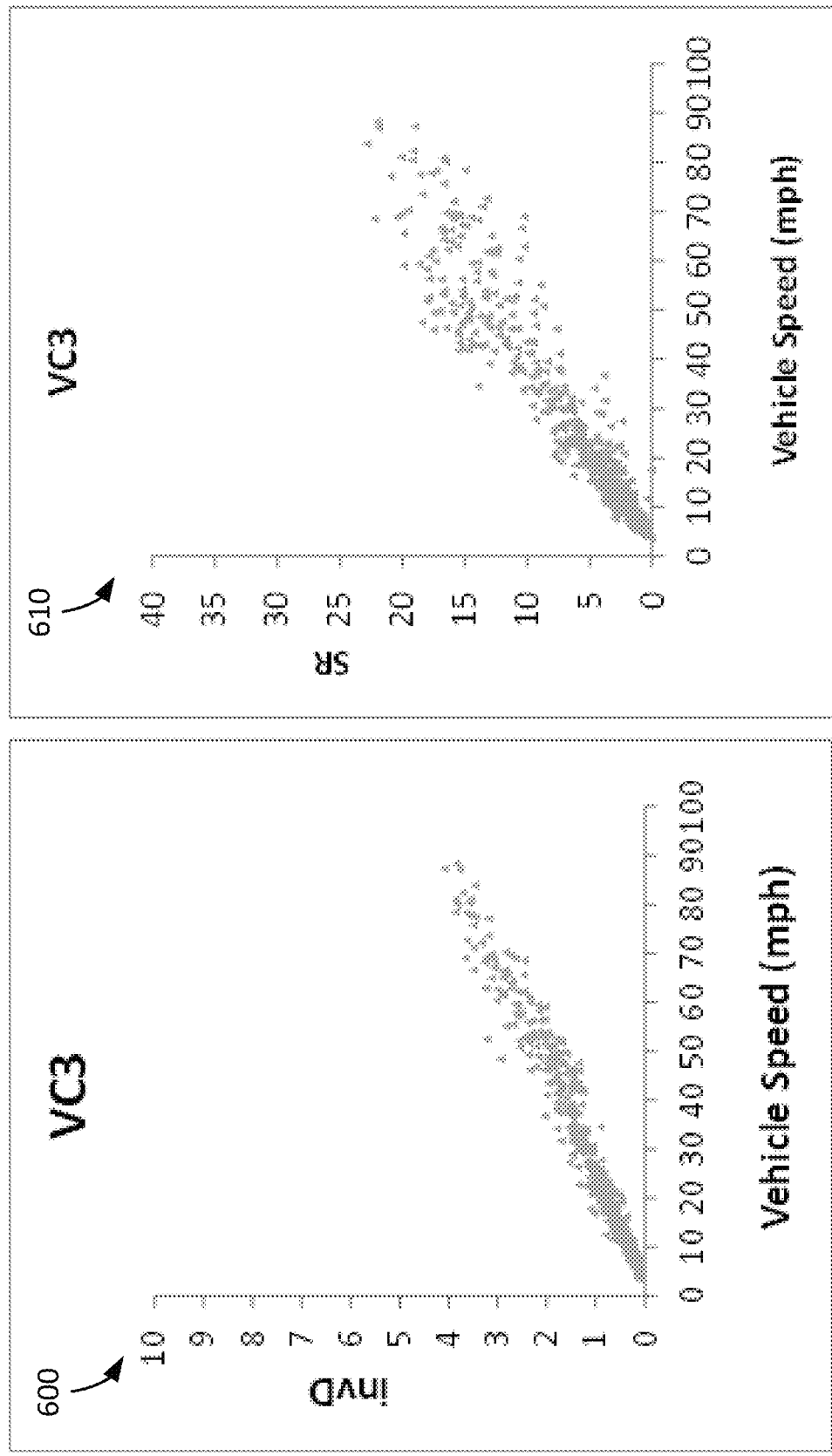
FIG. 6A has a plot showing a scatter plot of Speed versus invD for some empirical data for vehicle category 3 (VC3) vehicles.
FIG. 6B has a plot showing a scatter plot of Speed versus SR for the same vehicle category 3 (VC3) empirical data.

FIG. 6A has a plot 600 showing a scatter plot of Speed versus invD for empirical data for VC3. FIG. 6B has a plot 610 showing a scatter plot of Speed versus SR for the same VC3 data.

Figures 7A, 7B:
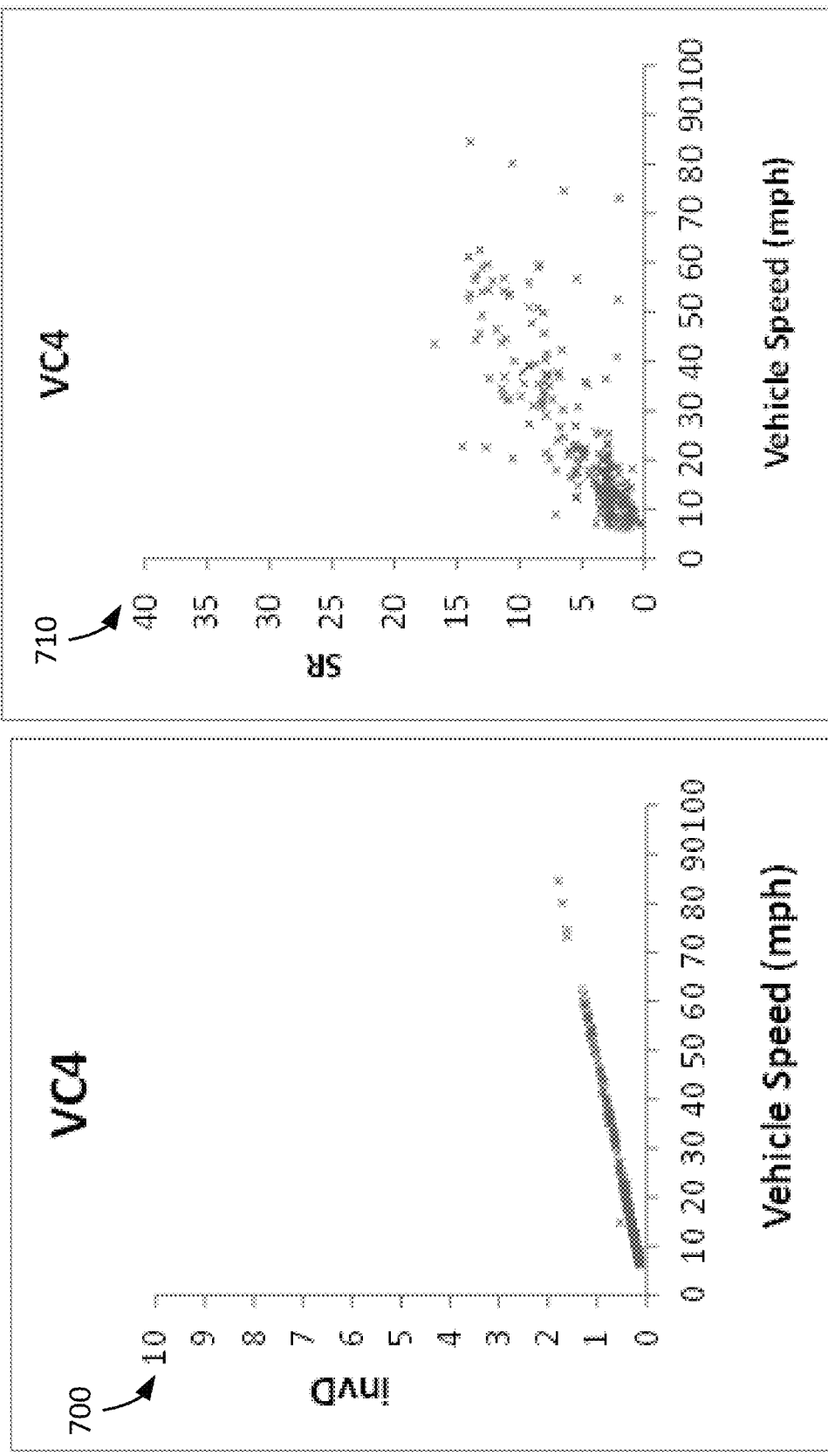
FIG. 7A has a plot showing a scatter plot of Speed versus invD for some empirical data for vehicle category 4 (VC4) vehicles.
FIG. 7B has a plot showing a scatter plot of Speed versus SR for the same vehicle category 4 (VC4) empirical data.

FIG. 7A has a plot 700 showing a scatter plot of Speed versus invD for empirical data for VC4. FIG. 7B has a plot 710 showing a scatter plot of Speed versus SR for the same VC4 data.

It is noted that candidate predictor variables were evaluated with univariate and bivariate statistics with the goal to obtain maximum amount of information from a minimum number of variables.

The speed estimation regression models are validated by examining the criteria including F test, adjusted R square (R2), root Mean Square Error (MSE), and coefficient of variation (CV). The F test ensured the significance of the selected regressors (i.e., the predictor variables) responsible of estimating vehicle speed. The R2 is checked to see how the proposed regression models are fit to the data. The MSE and CV are calculated to approximate the accuracy of the estimated vehicle speeds. The speed estimation regression models are further validated using different empirical datasets from the same and different highways to ensure applicability and transferability.

Having thus described several aspects of at least one embodiment of this invention, it is to be appreciated that various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

Various aspects of the present invention may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any suitable manner with aspects described in other embodiments.

Also, the invention may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

For the purposes of describing and defining the present disclosure, it is noted that terms of degree (e.g., "substantially," "slightly," "about," "comparable," etc.) may be utilized herein to represent the inherent degree of uncertainty that may be attributed to any quantitative comparison, value, measurement, or other representation. Such terms of degree may also be utilized herein to represent the degree by which a quantitative representation may vary from a stated reference (e.g., about 10% or less) without resulting in a change in the basic function of the subject matter at issue. Unless otherwise stated herein, any numerical values appeared in this specification are deemed modified by a term of degree thereby reflecting their intrinsic uncertainty.

Ranges described by the present disclosure are generally inclusive of the stated values. For example, the range between 0 and 1 includes the values of 0 and 1.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

What is claimed is:

1. A system for estimating a speed of a vehicle, the system comprising:
    a hardware interface configured to receive a vehicle signature from an inductive loop sensor, the vehicle signature comprising a plurality of data points sampled at a sampling rate;
    a processor; and
    a non-transitory computer-readable storage medium having a plurality of modules containing code executable by the processor, the plurality of modules including:
        a data processing module configured to determine whether the vehicle signature is representative of a vehicle passing over the inductive loop sensor and configured to disregard the vehicle signature when the vehicle signature is determined as being not representative of a vehicle;
        a vehicle profile module that determines an inverse of a temporal duration (invD) of the vehicle signature and a second variable value (SR) that is proportional to a slope of the vehicle signature; and
        a speed estimation module that estimates the speed of the vehicle using the inverse of the temporal duration, the second variable value, and a regression model for a vehicle category to which the vehicle belongs, in accordance with the following equation:

$$\text{Speed} = a + b \cdot \text{invD} + c \cdot \text{SR},$$

where a, b, and c are regression parameters determined from the regression model,
    wherein the temporal duration is equal to a total number of data points in the vehicle signature divided by the sampling rate, and
    wherein the data processing module is configured to determine that the vehicle signature is not representative of a vehicle, if a quantity of the data points in the vehicle signature is less than a first predetermined threshold.

2. The system of claim 1, wherein the vehicle profile module determines the second variable value by normalizing the vehicle signature, identify an earliest time point at which the amplitude of the normalized vehicle signature exceeds a threshold value, and calculates the slope of the normalized vehicle signature at said earliest time point, wherein the threshold value is about 0.4.

3. The system of claim 2, wherein the hardware interface is further configured to receive vehicle classification information and the system further comprises a vehicle cluster module configured to assign the vehicle to the vehicle category based on the vehicle classification information.

4. The system of claim 1, wherein the vehicle signature comprises data representing a series of inductance changes caused by the vehicle traversing the inductive loop sensor, thereby producing a waveform.

5. The system of claim 1, wherein the data processing module is configured to determine that the vehicle signature is not representative of a vehicle, if one of the data points having a greatest magnitude in the vehicle signature is less than a second predetermined threshold.

6. A system for estimating a speed of a vehicle, the system comprising:
an inductive loop sensor having a single loop;
an instrument that, in response to the vehicle passing over the inductive loop sensor, measures a vehicle signature of the vehicle from the inductive loop sensor, the vehicle signature comprising a plurality of data points sampled at a sampling rate;
a vehicle classification unit that determines a class of the vehicle;
a processor; and
a non-transitory computer-readable storage medium having a plurality of modules containing code executable by the processor, the plurality of modules including:
a data processing module configured to determine whether the vehicle signature is representative of a vehicle passing over the inductive loop sensor and configured to disregard the vehicle signature when the vehicle signature is determined as being not representative of a vehicle;
a vehicle profile module that determines an inverse of a duration (invD) of the vehicle signature and a second variable value (SR) that is proportional to a slope of the vehicle signature; and
a speed estimation module that estimates the speed of the vehicle using the first inverse of the duration, the second variable value, and a regression model for the class of the vehicle, in accordance with the following equation:

$$\text{Speed} = a + b \cdot \text{invD} + c \cdot \text{SR},$$

where a, b, and c are regression parameters determined from the regression model,
wherein the temporal duration is equal to a total number of data points in the vehicle signature divided by the sampling rate, and
wherein the data processing module is configured to determine that the vehicle signature is not representative of a vehicle, if a quantity of the data points in the vehicle signature is less than a first predetermined threshold.

7. The system of claim 6, wherein the second variable value is the slope of the vehicle signature after normalization at a first crossing of a threshold value.

8. The system of claim 7, wherein the vehicle signature is normalized by dividing the vehicle signature less the vehicle signature's minimum value by the vehicle signature's range, and the threshold value is about 0.4.

9. The system of claim 6, wherein the vehicle classification unit determines the class of the vehicle from the vehicle signature.

10. The system of claim 9, where in the vehicle classification unit is a module among the plurality of modules and is configured to determine the class of the vehicle using a k-nearest neighbors algorithm (KNN) and an interpolated representation of the vehicle signature.

11. The system of claim 10, wherein the vehicle classification unit is configured to use an interpolated representation of the vehicle signature having between 20 and 50 samples.

12. The system of claim 6, wherein the data processing module is configured to determine that the vehicle signature is not representative of a vehicle, if one of the data points having a greatest magnitude in the vehicle signature is less than a second predetermined threshold.

\* \* \* \* \*